(12) United States Patent
Wang et al.

(10) Patent No.: US 11,573,419 B2
(45) Date of Patent: Feb. 7, 2023

(54) DISPLAY DEVICE AND DISPLAY METHOD (71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chenru Wang, Beijing (CN); Ruijun Dong, Beijing (CN); Yali Liu, Beijing (CN); Ke Li, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 461 days.

(21) Appl. No.: 16/668,151

(22) Filed: Oct. 30, 2019

(65) Prior Publication Data
US 2020/0264436 A1 Aug. 20, 2020

(30) Foreign Application Priority Data
Feb. 20, 2019 (CN) .......................... 201910126026.3

(51) Int. Cl.
*G02B 27/01* (2006.01)
*G02B 27/00* (2006.01)
*G02B 27/28* (2006.01)

(52) U.S. Cl.
CPC ..... *G02B 27/0172* (2013.01); *G02B 27/0075* (2013.01); *G02B 27/283* (2013.01);
(Continued)

(58) Field of Classification Search
CPC ............ G02B 27/0172; G02B 27/0075; G02B 27/283; G02B 2027/0123;
(Continued)

(56) References Cited

U.S. PATENT DOCUMENTS

| | | | | |
|---|---|---|---|---|
| 5,982,343 A * | 11/1999 | Iba | ..................... | G02B 27/0172 345/8 |
| 7,982,972 B2 * | 7/2011 | Inoguchi | ............ | G02B 27/1066 359/726 |

(Continued)

FOREIGN PATENT DOCUMENTS

| CN | 103886826 A | 6/2014 |
|---|---|---|
| CN | 104036731 A | 9/2014 |

(Continued)

OTHER PUBLICATIONS

First Chinese Office Action from Chinese Patent Application No. 201910129993.5 dated Apr. 29, 2020.
(Continued)

*Primary Examiner* — Thomas K Pham
*Assistant Examiner* — Henry A Duong
(74) *Attorney, Agent, or Firm* — Dilworth & Barrese, LLP.; Michael J. Musella, Esq.

(57) ABSTRACT

A display device and a display method are provided. The display device includes a first screen and a first reflector on a light emission side of the first screen; the first screen and the first reflector are in a first light path; the display device further includes a second screen and a second reflector on a light emission side of the second screen; the second screen and the second reflector are in a second light path; the first light path and the second light path converge in a first position.

17 Claims, 2 Drawing Sheets (52) U.S. Cl.
CPC ............... *G02B 2027/0123* (2013.01); *G02B 2027/0127* (2013.01)

(58) Field of Classification Search
CPC .... G02B 2027/0127; G02B 2027/0134; G02B 27/0101; G02B 5/3025; G02B 5/3033; G02F 1/133528
USPC ..................................................... 359/483.01
See application file for complete search history.

(56) References Cited

U.S. PATENT DOCUMENTS

| | | | |
|---|---|---|---|
| 9,646,533 | B2 | 5/2017 | Hong et al. |
| 10,068,520 | B2 | 9/2018 | Xiang et al. |
| 10,656,418 | B2 | 5/2020 | Ma |
| 10,962,795 | B1 * | 3/2021 | Collier ................. G02B 27/286 |
| 2016/0035280 | A1 | 2/2016 | Kim et al. |
| 2016/0327819 | A1 | 11/2016 | Chao |
| 2018/0074629 | A1 | 3/2018 | Lee et al. |
| 2019/0293930 | A1 | 9/2019 | Zhang et al. |
| 2019/0317320 | A1 * | 10/2019 | Park ..................... G02B 27/144 |
| 2020/0033603 | A1 * | 1/2020 | Ohkawa ............. G02B 27/0103 |
| 2020/0033614 | A1 | 1/2020 | Shi |
| 2020/0089002 | A1 | 3/2020 | Lee |
| 2020/0201036 | A1 | 6/2020 | Hong |

FOREIGN PATENT DOCUMENTS

| | | |
|---|---|---|
| CN | 104715717 A | 6/2015 |
| CN | 106548752 A | 3/2017 |
| CN | 107277496 A | 10/2017 |
| CN | 107367845 A | 11/2017 |
| CN | 108398788 A | 8/2018 |
| CN | 108766993 A | 11/2018 |
| CN | 108957755 A | 12/2018 |
| CN | 108983423 A | 12/2018 |
| CN | 109143576 A | 1/2019 |
| CN | 109166529 A | 1/2019 |
| CN | 109188700 A | 1/2019 |
| KR | 1020160061474 A | 6/2016 |
| KR | 1020170079330 A | 7/2017 |
| WO | 2018221867 A1 | 6/2018 |
| WO | 2018190007 A1 | 10/2018 |

OTHER PUBLICATIONS

First Chinese Office Action from Chinese Patent Application No. 201910126026.3 dated Aug. 31, 2020.

* cited by examiner

S01: emitting light toward a first reflector by employing a first screen, so that the first screen and the first reflector form a first light path.

S02: emitting light toward a second reflector by employing a second screen, so that the second screen and the second reflector form a second light path, and the first light path and the second light path converge in a first position.

S03: converting the light emitted by the first screen into light having a first polarization direction by employing a first polarizer located between the first screen and the first reflector.

S04: converting the light emitted by the second screen into light having a second polarization direction by employing a second polarizer located between the second screen and the second reflector. The first polarization direction is perpendicular to the second polarization direction; the first reflector is located in the second light path, and the first reflector is reflective with respect to the light that being transmitted through the first polarizer and having the first polarization direction, and is transmissive with respect to the light being transmitted through the second polarizer and having the second polarization direction.

FIG. 4

DISPLAY DEVICE AND DISPLAY METHOD

This application claims the benefit of Chinese patent application No. 201910126026.3 filed on Feb. 20, 2019, which is hereby entirely incorporated by reference as a part of the present application.

TECHNICAL FIELD

Embodiments of the present disclosure relates to a display device and a display method.

BACKGROUND

Virtual Reality (VR) generates a virtual world of a three-dimensional space by using computer simulation, to provide a user with simulations of senses such as a visual sense, an auditory sense and a tactile sense, so that the user has a strong sense of "immersion" and "presence". Augmented Reality (AR) is a technology that combines real world information with virtual world information, increases the user's perception of the real world through information provided by computer systems, and superimposes computer-generated virtual objects, scenes or information into a real scene.

SUMMARY

According to an aspect of the embodiments of the present disclosure, a display device is provided. The display device includes a first screen and a first reflector on a light emission side of the first screen; the first screen and the first reflector are in a first light path; the display device further includes a second screen and a second reflector on a light emission side of the second screen; the second screen and the second reflector are in a second light path; the first light path and the second light path converge in a first position.

For example, in some embodiments, the display device further includes a first polarizer between the first screen and the first reflector, and a second polarizer between the second screen and the second reflector; the first polarizer has a first polarization direction, the second polarizer has a second polarization direction, and the first polarization direction is perpendicular to the second polarization direction; the first reflector is in the second light path, the first reflector is reflective with respect to light being transmitted through the first polarizer and having the first polarization direction, and the first reflector is transmissive with respect to light being transmitted through the second polarizer and having the second polarization direction.

For example, in some embodiments, the light being transmitted through the second polarizer and having the second polarization direction is transmitted through the first reflector, then is reflected by the second reflector back to the first reflector, and is transmitted through the first reflector again.

For example, in some embodiments, the display device further includes a third screen and a third reflector on a light emission side of the third screen; the third screen and the third reflector are in a third light path; the display device further includes a fourth screen and a fourth reflector on a light emission side of the fourth screen; the fourth screen and the fourth reflector are in a fourth light path; the third light path and the fourth light path converge in a second position.

For example, in some embodiments, the display device further includes a third polarizer between the third screen and the third reflector, and a fourth polarizer between the fourth screen and the fourth reflector; the third polarizer has the first polarization direction, and the fourth polarizer has the second polarization direction; and the third reflector is in the fourth light path, the third reflector is reflective with respect to light being transmitted through the third polarizer and having the first polarization direction, and the third reflector is transmissive with respect to light being transmitted through the fourth polarizer and having the second polarization direction.

For example, in some embodiments, the light being transmitted through the fourth polarizer and having the second polarization direction is transmitted through the third reflector, then is reflected by the fourth reflector back to the third reflector, and is transmitted through the third reflector again.

For example, in some embodiments, the first light path and the third light path are symmetric with respect to a symmetrical plane; and the second light path and the fourth light path are symmetric with respect to the symmetrical plane.

For example, in some embodiments, the first reflector has a first magnification; and the second reflector has a second magnification that is different from the first magnification.

For example, in some embodiments, the first reflector and the third reflector have a first magnification; and the second reflector and the fourth reflector have a second magnification that is different from the first magnification.

For example, in some embodiments, the display device further includes a reflector element, and the reflector element receives light from the first reflector and light from the second reflector, and redirect the light from the first reflector and the light from the second reflector to the first position.

For example, in some embodiments, the display device further includes a reflector element, and the reflector element receives light from the first reflector, light from the second reflector, light from the third reflector and light from the fourth reflector, redirects the light from the first reflector and the light from the second reflector to the first position, and redirects the light from the third reflector and the light from the fourth reflector to the second position.

For example, in some embodiments, the reflector element is a partially-transmissive partially-reflective reflector.

For example, in some embodiments, the first screen and the second screen are configured to display different pictures.

For example, in some embodiments, the first screen and the third screen are configured to simultaneously display different portions of a same picture, and the second screen and the fourth screen are configured to simultaneously display different portions of another same picture.

According to another aspect of the embodiments of the present disclosure, a display method is provided. The display method includes: emitting light toward a first reflector by using a first screen, so that the first screen and the first reflector are in a first light path; and emitting light toward a second reflector by using a second screen, so that the second screen and the second reflector are in a second light path; the first light path and the second light path converge in a first position.

For example, in some embodiments, the method further includes: converting the light emitted by the first screen into light having a first polarization direction by using a first polarizer between the first screen and the first reflector; and converting the light emitted by the second screen into light having a second polarization direction by using a second polarizer between the second screen and the second reflector. The first polarization direction is perpendicular to the second polarization direction; the first reflector is in the second light path, the first reflector is reflective with respect to the light being transmitted through the first polarizer and having the first polarization direction, and the first reflector is transmissive with respect to the light being transmitted through the second polarizer and having the second polarization direction.

For example, in some embodiments, the method further includes: emitting light toward a third reflector by using a third screen, so that the third screen and the third reflector are in a third light path; and emitting light toward a fourth reflector by using a fourth screen, so that the fourth screen and the fourth reflector are in a fourth light path; wherein the third light path and the fourth light path converge in a second position.

For example, in some embodiments, the method further includes: converting the light emitted by the third screen into light having the first polarization direction by using a third polarizer between the third screen and the third reflector; and converting the light emitted by the fourth screen into light having the second polarization direction by using a fourth polarizer between the fourth screen and the fourth reflector. The third reflector is in the fourth light path, the third reflector is reflective with respect to the light being transmitted through the third polarizer and having the first polarization direction, and the third reflector is transmissive with respect to the light being transmitted through the fourth polarizer and having the second polarization direction.

For example, in some embodiments, the first reflector and the third reflector have a first magnification; and the second reflector and the fourth reflector have a second magnification that is different from the first magnification.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
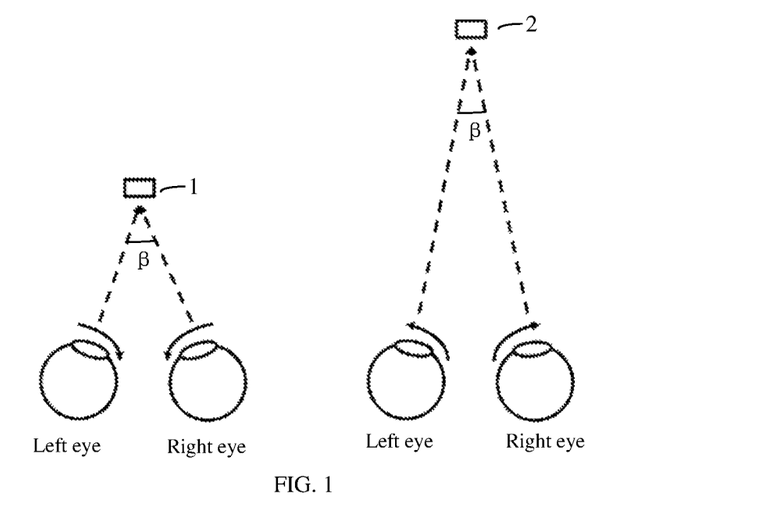
FIG. 1 shows a principle of a vergence-accommodation conflict.

When implementing virtual reality and augmented reality, two eyes of an observer adjust a focus through crystalline lenses respectively. A left eye view and/or a right eye view are processed and integrated through the brain. In order to reflect a spatial position of an object, a depth difference is between a plurality of virtual image planes. Therefore, the eyes need to perform vergence-accommodation rotation. This causes the eyes to fatigue when watching a dynamic 3D image continuously. As shown in FIG. 1, vergence refers to that when the eyes view objects (or virtual images) 1 and 2 at different distances, eyeballs rotate a slight angle, that is, a convergence angle $\beta$ changes.

The inventors find that, a vergence-accommodation conflict in virtual reality and augmented reality causes eye fatigue and dizziness, and in this regard, the inventors propose multi-focus display. In addition, in the virtual reality and the augmented reality, a limited field of view reduces a sense of immersion and influence an experience effect.

Figure 2:
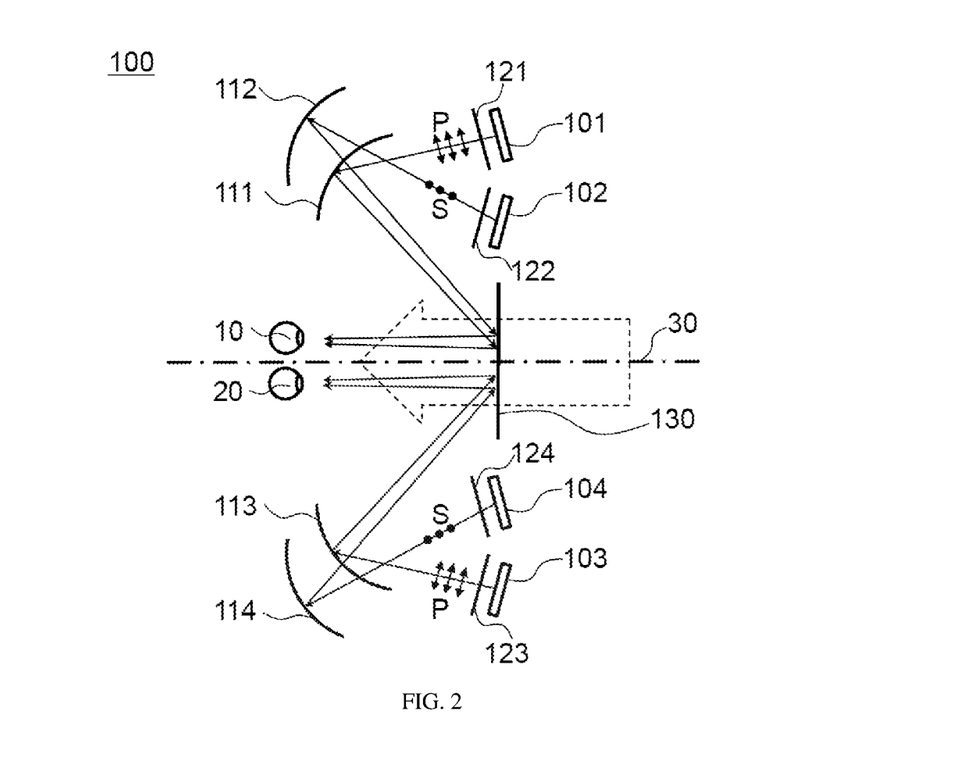
FIG. 2 is a structural schematic diagram of a display device according to the embodiments of the present disclosure.

According to one aspect of the embodiments of the present disclosure, a display device is provided. As shown in FIG. 2, the display device 100 includes a first screen 101, and a first reflector 111 located on a light emission side of the first screen 101; the first screen 101 and the first reflector 111 form a first light path; the display device 100 further includes a second screen 102, and a second reflector 112 located on a light emission side of the second screen 102; the second screen 102 and the second reflector 112 form a second light path; the first light path and the second light path converge in a first position 10 (the first position 10 is, for example, but not limited to, a pupil of the left eye or a pupil of the right eye of the user).

In the embodiments of the present disclosure, projection to the first position is performed by using at least two screens and two reflectors. The pupil located in the first position can simultaneously receive images from the two screens. With the above-described arrangement, the images from the two screens may be respectively adjusted through the two reflectors, which, thus, increases flexibility of variation of a field of view and effectively reduces the vergence-accommodation conflict, so as to improve an experience effect for a user.

For example, in some embodiments, as shown in FIG. 2, the display device 100 further includes: a first polarizer 121 located between the first screen 101 and the first reflector 111, and a second polarizer 122 located between the second screen 102 and the second reflector 112; the first polarizer 121 has a first polarization direction, the second polarizer 122 has a second polarization direction, and the first polarization direction is perpendicular to the second polarization direction to prevent light in the first light path and light in the second light path from interacting with each other; the first reflector 111 is not only located in the first light path but also located in the second light path; the first reflector 111 is reflective with respect to light being transmitted through the first polarizer 121 and having the first polarization direction (for example, P light shown in FIG. 2), and the first reflector 111 is transmissive with respect to light being transmitted through the second polarizer 122 and having the second polarization direction (for example, S light shown in FIG. 2).

It should be noted that, in the embodiments of the present disclosure, that an element "is located in a certain light path" means that the element receives and transmits (or reflects) light in the light path.

In some embodiments, as shown in FIG. 2, the display device 100 further includes the first polarizer 121 located between the first screen 101 and the first reflector 111, and the second polarizer 122 located between the second screen 102 and the second reflector 112; the polarization direction of the first polarizer 121 is perpendicular to the polarization direction of the second polarizer 122; the first reflector 111 is further configured to receive and reflect light emitted by the first screen 101, and to receive and transmit light emitted by the second screen 102; and the second reflector 112 is configured to receive and reflect the light emitted by the second screen 102. That is to say, the light that is transmitted through the first polarizer 121 and has the first polarization direction is reflected by the first reflector 111 and then reaches the first position; and the light that is transmitted through the second polarizer 122 and has the second polarization direction is transmitted through the first reflector 111, then is reflected by the second reflector 112 back to the first reflector 111, is transmitted through the first reflector 111 again, and subsequently reaches the first position. With the above-described arrangement, the first reflector 111 may be arranged in the light path between the second screen 102 and the second reflector 112. Thus, not only a larger field of view is implemented, but also optical components are effectively integrated, so that the display device is more compact.

For example, the first reflector 111 may include a polarizing beam splitting film or other type of element having a property of selecting polarization state, so as to implement selective reflection and transmission of polarized light.

For example, the second reflector 112 may include a non-selective reflector. Alternatively, for example, the second reflector 112 may include a polarizing beam splitting film, to better eliminate crosstalk of light from the first screen 101.

For example, in some embodiments, as shown in FIG. 2, the display device 100 further includes a third screen 103, and a third reflector 113 located on a light emission side of the third screen 103; the third screen 103 and the third reflector 113 form a third light path; the display device 100 further includes a fourth screen 104, and a fourth reflector 114 located on a light emission side of the fourth screen 104; the fourth screen 104 and the fourth reflector 114 form a fourth light path; the third light path and the fourth light path converge in a second position 20 (the second position 20 is, for example, but not limited to, a pupil of the right eye or a pupil of the left eye of the user), and the second position 20 is different from the first position 10.

Figure 3:
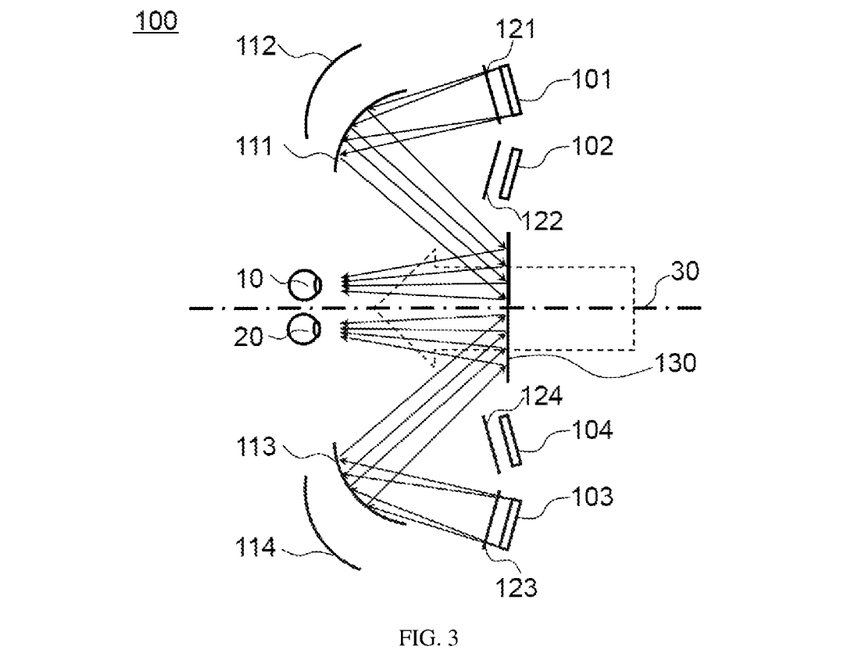
FIG. 3 shows a field of view of the display device as shown in FIG. 2.

With the above-described arrangement, the display device can simultaneously transmit images for the virtual reality or the augmented reality to the user's eyes, so as to further increase the field of view (as shown in FIG. 3), eliminate the vergence-accommodation conflict, and improve the experience effect.

For example, in some embodiments, as shown in FIG. 2, the display device 100 further includes: a third polarizer 123 located between the third screen 103 and the third reflector 113, and a fourth polarizer 124 located between the fourth screen 104 and the fourth reflector 114; the third polarizer 123 has the first polarization direction, the fourth polarizer 124 has the second polarization direction; the third reflector 113 is located in the fourth light path, and the third reflector 113 is reflective with respect to light being transmitted through the third polarizer 123 and having the first polarization direction (for example, P light shown in FIG. 2), and is transmissive with respect to light being transmitted through the fourth polarizer 124 and having the second polarization direction (for example, S light shown in FIG. 2). In this case, the light that is transmitted through the third polarizer 123 and has the first polarization direction is reflected by the third reflector 113 and then reaches the second position 20; and the light that is transmitted through the fourth polarizer 124 and has the second polarization direction is transmitted through the third reflector 113, then is reflected by the fourth reflector 114 back to the third reflector 113, is transmitted through the third reflector 113 again, and subsequently reaches the second position 20.

With the above-described arrangement, not only a larger field of view is implemented, but also optical components are effectively integrated, so that the display device is more compact.

For example, the third reflector 113 may include a polarizing beam splitting film, so as to implement selective reflection and transmission of polarized light.

For example, the fourth reflector 114 may include a non-selective reflector. Alternatively, for example, the fourth reflector 114 may include a polarizing beam splitting film or other type of element having property of selecting polarization state, so as to better eliminate crosstalk of light from the third screen 103.

For example, each of the first polarizer 121 to the fourth polarizer 124 is a polarizer for converting light from a screen into linearly polarized light. Specific types of the polarizers are not limited in the embodiments of the present disclosure.

For example, in some embodiments, as shown in FIG. 2, the first light path and the third light path are symmetric with respect to a symmetrical plane 30; and the second light path and the fourth light path are symmetric with respect to the symmetrical plane 30.

With a symmetrical arrangement, a symmetrical field of view may be provided to each of the two pupils of the user, which, thus, can implement a large field of view, accurately reproduce an image for the virtual reality or the augmented reality, and simplify system design.

For example, in some embodiments, as shown in FIG. 2, the first reflector 111 has a first magnification; and the second reflector 112 has a second magnification that is different from the first magnification.

In some embodiments, the first reflector and the second reflector have different magnifications to provide images having different focuses (i.e., depth of field or image distance) to the pupil located in the first position. With the above-described arrangement, multi-focus display is implemented, so as to effectively mitigate the vergence-accommodation conflict and further improve virtual experience. In addition, by magnifying light, it is favorable for improving a display effect and enhancing the user experience.

For example, in some embodiments, as shown in FIG. 2, the first reflector 111 and the third reflector 113 have the first magnification; and the second reflector 112 and the fourth reflector 114 have the second magnification that is different from the first magnification.

With the above-described arrangement, multi-focus display is implemented, so as to effectively mitigate the vergence-accommodation conflict and further improve the virtual experience.

For example, a distance from the first reflector 111 to the first screen 101 is different from a distance from the second reflector 112 to the second screen 102, such that the first reflector 111 and the second reflector 112 have different magnifications; or, the first reflector 111 and the second reflector 112 are both curved reflectors, and the first reflector 111 and the second reflector 112 have different curvatures, so as to have different magnifications. Similarly, a distance from the third reflector 113 to the third screen 103 is different from a distance from the fourth reflector 114 to the fourth screen 104, such that the third reflector 113 and the fourth reflector 114 have different magnifications; or, the third reflector 113 and the fourth reflector 114 are both curved reflectors, and the third reflector 113 and the fourth reflector 114 have different curvatures, so as to have different magnifications. The embodiments of the present disclosure include, but are not limited to, the enumerated modes of implementing different magnifications.

For example, each of the first reflector, the second reflector, the third reflector and the fourth reflector according to the embodiments of the present disclosure may be a spherical reflector or a free-form reflector. Specific surface shapes of the reflectors may be set according to actual needs, and the embodiments of the present disclosure are not limited thereto.

For example, the first screen 101 and the second screen 102 are configured to display different pictures, and this is favorable for multi-focus display and improves the user's experience.

For example, the first screen 101 and the third screen 103 are configured to simultaneously display different portions of a same picture, and the second screen 102 and the fourth screen 104 are configured to simultaneously display different portions of another same picture. For example, the first screen 101 is configured to display a left half portion of a first picture, and the third screen 103 is configured to display a right half portion of the first picture, such that a same eye of the user may see the complete first picture through the first light path where the first screen 101 is located and the third light path where the third screen 103 is located, that is, the first picture is obtained by piecing the left half portion and the right half portion together. Similarly, the same eye of the user can see the complete second picture through the second light path where the second screen 102 is located and the fourth light path where the fourth screen 104 is located. Both the first picture and the second picture are obtained by piecing together, which is favorable for implementing a large field of view.

For example, each of the first screen 101 to the fourth screen 104 may be a liquid crystal display panel or an organic light-emitting diode (OLED) display panel or other type of display panel. Types of the screens are not limited in the embodiments of the present disclosure.

For example, in some embodiments, as shown in FIG. 2, the display device 100 further includes a reflector element 130, and the reflector element 130 receives light from the first reflector 111 and light from the second reflector 112, and redirect the light from the first reflector 111 and the light from the second reflector 112 to the first position 10.

With the above-described arrangement, the display device may be integrated in a wearable apparatus in a form such as glasses or a helmet, so as to further improve the virtual experience.

For example, in some embodiments, as shown in FIG. 2, the display device 100 further includes a reflector element 130, and the reflector element 130 receives light from the first reflector 111, light from the second reflector 112, light from the third reflector 113 and light from the fourth reflector 114, redirects the light from the first reflector 111 and the light from the second reflector 112 to the first position 10, and redirects the light from the third reflector 113 and the light from the fourth reflector 114 to the second position 20.

With the above-described arrangement, the display device may simultaneously transmit images for virtual reality or augmented reality to the user's two eyes, so as to further increase the field of view (as shown in FIG. 3), eliminate the vergence-accommodation conflict, and improve the experience effect.

For example, in some embodiments, as shown in FIG. 2, the reflector element 130 is a partially-transmissive partially-reflective reflector. Proportions of light transmitted and reflected by the partially-transmissive partially-reflective reflector are not limited in the embodiments of the present disclosure, as long as the reflector can simultaneously transmit and reflect light. Thus, light from a real environment (as indicated by a dashed arrow in FIG. 2) may reach the first position and/or the second position through the partially-transmissive partially-reflective reflector. The above-described arrangement may be applied in an augmented reality technology, so as to improve virtual experience of the augmented reality technology.

In some embodiments, the reflector element is a transflective surface. For example, the reflector element 130 may be planar, spherical, aspherical or be a free-form curved surface. For example, the reflector element 130 is perpendicular to the symmetrical plane 30.

Figure 4:
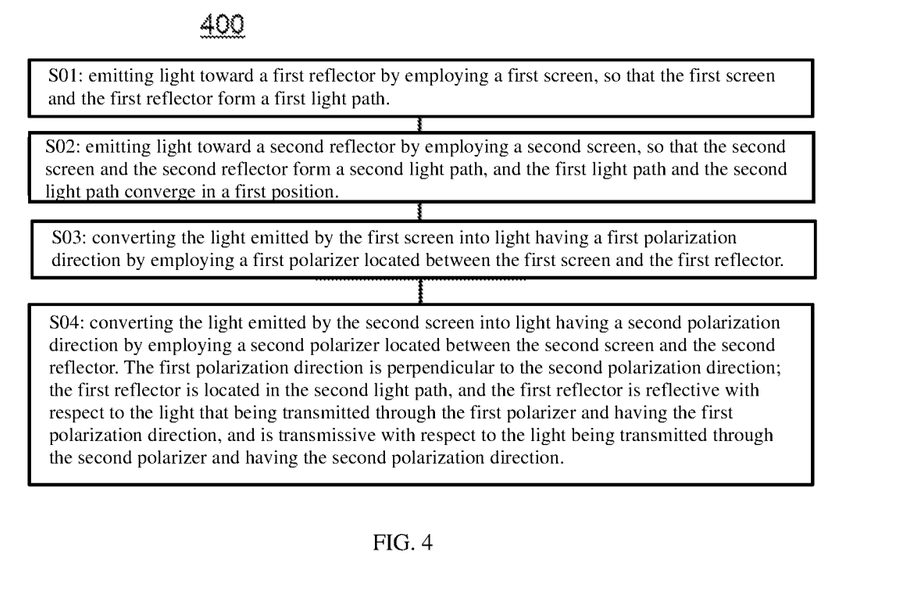
FIG. 4 is a flow chart of a display method according to the embodiments of the present disclosure.

According to another aspect of the embodiments of the present disclosure, a display method is provided. As shown in FIG. 4, the display method 400 includes step S01 and step S02 below.

Step S01: emitting light toward the first reflector by using the first screen, so that the first screen and the first reflector form the first light path.

Step S02: emitting light toward the second reflector by using the second screen, so that the second screen and the second reflector form the second light path, and the first light path and the second light path converge in the first position.

In the embodiments of the present disclosure, projection to the first position is performed by using at least two screens and two reflectors. The pupil located in the first position can simultaneously receive images from the two screens. With the above-described arrangement, the images from the two screens may be respectively adjusted through the two reflectors, which, thus, increases flexibility of variation of the field of view and effectively reduces the vergence-accommodation conflict.

For example, in some embodiments, as shown in FIG. 4, the display method 400 further includes step S03 and step S04.

Step S03: converting the light emitted by the first screen into the light having the first polarization direction by using the first polarizer located between the first screen and the first reflector.

Step S04: converting the light emitted by the second screen into the light having the second polarization direction by using the second polarizer located between the second screen and the second reflector. The first polarization direction is perpendicular to the second polarization direction; the first reflector is located in the second light path, and the first reflector is reflective with respect to the light being transmitted through the first polarizer and having the first polarization direction, and is transmissive with respect to the light being transmitted through the second polarizer and having the second polarization direction.

In some embodiments, as shown in FIG. 2, the display device 100 further includes: the first polarizer 121 located between the first screen 101 and the first reflector 111, and the second polarizer 122 located between the second screen 102 and the second reflector 112; the polarization direction of the first polarizer 121 is perpendicular to the polarization direction of the second polarizer 122. The first reflector 111 is further configured to: receive and reflect the light emitted by the first screen 101, and receive and transmit the light emitted by the second screen 102. The second reflector 112 is configured to: receive and reflect the light emitted by the second screen 102. That is to say, the light that is transmitted through the first polarizer 121 and has the first polarization direction is reflected by the first reflector 111 and then reaches the first position; and the light that is transmitted through the second polarizer 122 and has the second polarization direction is transmitted through the first reflector 111, then is reflected by the second reflector 112 back to the first reflector 111, is transmitted through the first reflector 111 again, and subsequently reaches the first position. With the above-described arrangement, the first reflector 111 may be arranged in the light path between the second screen 102 and the second reflector 112. Thus, not only a larger field of view is implemented, but also optical components are effectively integrated, so that the display device is more compact.

For example, the first reflector 111 may include a polarizing beam splitting film, so as to implement selective reflection and transmission of polarized light.

For example, the second reflector 112 may include a non-selective reflector. Alternatively, for example, the second reflector 112 may include a polarizing beam splitting film or other type of element having the property of selecting polarization state, so as to better eliminate crosstalk of light from the first screen 101.

For example, in some embodiments, the display method further includes: emitting light toward the third reflector by using the third screen, so that the third screen and the third reflector form the third light path; and emitting light toward the fourth reflector by using the fourth screen, so that the fourth screen and the fourth reflector form the fourth light path, and the third light path and the fourth light path converge in the second position.

Thus, images for virtual reality or augmented reality may be simultaneously transmitted to the user's two eyes, so as to further increase the field of view (as shown in FIG. 3), eliminate the vergence-accommodation conflict, and improve the experience effect.

For example, in some embodiments, the display method further includes: converting the light emitted by the third screen into light having the first polarization direction by using the third polarizer located between the third screen and the third reflector; converting the light emitted by the fourth screen into light having the second polarization direction by using the fourth polarizer located between the fourth screen and the fourth reflector. The third reflector is located in the fourth light path, and the third reflector is reflective with respect to the light being transmitted through the third polarizer and having the first polarization direction, and is transmissive with respect to the light being transmitted through the fourth polarizer and having the second polarization direction. In this case, the light that is transmitted through the third polarizer 123 and has the first polarization direction is reflected by the third reflector 113 and then reaches the second position 20; and the light that is transmitted through the fourth polarizer 124 and has the second polarization direction is transmitted through the third reflector 113, then is reflected by the fourth reflector 114 back to the third reflector 113, is transmitted through the third reflector 113 again, and subsequently reaches the second position 20.

Thus, not only a larger field of view is implemented, but also optical components are effectively integrated, so that the display device is more compact.

For example, in some embodiments, as shown in FIG. 2, the first light path and the third light path are symmetric with respect to the symmetrical plane 30; and the second light path and the fourth light path are symmetric with respect to the symmetrical plane 30.

With a symmetrical arrangement, a symmetrical field of view may be provided to each of the two pupils of the user, which, thus, can implement a large field of view, accurately reproduce an image for virtual reality or augmented reality, and simplify system design.

For example, in some embodiments, the first reflector has the first magnification; and the second reflector has the second magnification that is different from the first magnification. Alternatively, for example, the first reflector and the third reflector have the first magnification; and the second reflector and the fourth reflector have the second magnification that is different from the first magnification.

In some embodiments, the first reflector and the second reflector have different magnifications to provide images having different focuses (i.e., depth of field or image distance) to the pupil located in the first position. With the above-described arrangement, multi-focus display is implemented, so as to effectively mitigate the vergence-accommodation conflict and further improve virtual experience.

As a non-limiting example, a reference using "A and/or B", when used in conjunction with open-ended language (such as "including") can refer to A only (optionally including elements other than B) in one embodiment, to B only (optionally including elements other than A) in another embodiment, or to both A and B (optionally including other elements) in yet another embodiment; etc. It should also be understood that, unless clearly indicated to the contrary, in any method that includes more than one step or action as claimed herein, a sequence of steps or actions of the method is not necessarily limited to the described sequence of steps or actions of the method.

What are described above is related to the illustrative embodiments of the disclosure only and not limitative to the scope of the disclosure; the scopes of the disclosure are defined by the accompanying claims.

What is claimed is:

1. A display device, comprising:
a first screen and a first reflector on a light emission side of the first screen, wherein the first screen and the first reflector are in a first light path;
a second screen and a second reflector on a light emission side of the second screen, wherein the second screen and the second reflector are in a second light path;
wherein the first light path and the second light path converge in a first position;
wherein the first screen, the first reflector, the second screen and the second reflector are provided on a same side of the first position in front of the first position and avoid a straight ahead position of the first position;
wherein the display device further comprising a first polarizer between the first screen and the first reflector, and a second polarizer between the second screen and the second reflector; the first polarizer has a first polarization direction, the second polarizer has a second polarization direction, and the first polarization direction is perpendicular to the second polarization direction;

wherein the first reflector is in the second light path, the first reflector is reflective with respect to light being transmitted through the first polarizer and having the first polarization direction, and the first reflector is transmissive with respect to light being transmitted through the second polarizer and having the second polarization direction; and wherein the first screen and the first polarizer as well as the second screen and the second polarizer are located on a first side of the first reflector, the second reflector is located on a second side of the first reflector, and the first side of the first reflector and the second side of the first reflector are two opposite sides of the first reflector; and the light being transmitted through the second polarizer and having the second polarization direction is transmitted through the first reflector, then is reflected by the second reflector back to the first reflector, and is transmitted through the first reflector again.

2. The display device according to claim 1, further comprising:

a third screen and a third reflector on a light emission side of the third screen, wherein the third screen and the third reflector are in a third light path;

a fourth screen and a fourth reflector on a light emission side of the fourth screen, wherein the fourth screen and the fourth reflector are in a fourth light path;

wherein the third light path and the fourth light path converge in a second position.

3. The display device according to claim 2, further comprising: a third polarizer between the third screen and the third reflector, and a fourth polarizer between the fourth screen and the fourth reflector;

wherein the third polarizer has the first polarization direction, and the fourth polarizer has the second polarization direction; and the third reflector is in the fourth light path, the third reflector is reflective with respect to light being transmitted through the third polarizer and having the first polarization direction, and the third reflector is transmissive with respect to light being transmitted through the fourth polarizer and having the second polarization direction.

4. The display device according to claim 3, wherein the light being transmitted through the fourth polarizer and having the second polarization direction is transmitted through the third reflector, then is reflected by the fourth reflector back to the third reflector, and is transmitted through the third reflector again.

5. The display device according to claim 2, wherein the first light path and the third light path are symmetric with respect to a symmetrical plane; and the second light path and the fourth light path are symmetric with respect to the symmetrical plane.

6. The display device according to claim 2, wherein the first reflector and the third reflector have a first magnification; and the second reflector and the fourth reflector have a second magnification that is different from the first magnification.

7. The display device according to claim 2, further comprising: a reflector element, wherein the reflector element receives light from the first reflector, light from the second reflector, light from the third reflector and light from the fourth reflector, redirects the light from the first reflector and the light from the second reflector to the first position, and redirects the light from the third reflector and the light from the fourth reflector to the second position.

8. The display device according to claim 7, wherein the reflector element is a partially-transmissive partially-reflective reflector.

9. The display device according to claim 2, wherein the first screen and the third screen are configured to simultaneously display different portions of a same picture, and the second screen and the fourth screen are configured to simultaneously display different portions of another same picture.

10. The display device according to claim 1, wherein the first reflector has a first magnification; and the second reflector has a second magnification that is different from the first magnification.

11. The display device according to claim 1, further comprising: a reflector element, wherein the reflector element receives light from the first reflector and light from the second reflector, and redirect the light from the first reflector and the light from the second reflector to the first position.

12. The display device according to claim 11, wherein the reflector element is a partially-transmissive partially-reflective reflector.

13. The display device according to claim 1, wherein the first screen and the second screen are configured to display different pictures.

14. A display method, comprising:

emitting light toward a first reflector by using a first screen, wherein the first screen and the first reflector are in a first light path; and emitting light toward a second reflector by using a second screen, wherein the second screen and the second reflector are in a second light path;

wherein the first light path and the second light path converge in a first position;

wherein the first screen, the first reflector, the second screen and the second reflector are provided on a same side of the first position in front of the first position and avoid a straight ahead position of the first position;

wherein the method further comprises: converting the light emitted by the first screen into light having a first polarization direction by using a first polarizer between the first screen and the first reflector, and converting the light emitted by the second screen into light having a second polarization direction by using a second polarizer between the second screen and the second reflector; and the first polarization direction is perpendicular to the second polarization direction;

wherein the first reflector is in the second light path, the first reflector is reflective with respect to the light being transmitted through the first polarizer and having the first polarization direction, and the first reflector is transmissive with respect to the light being transmitted through the second polarizer and having the second polarization direction; and wherein the first screen and the first polarizer as well as the second screen and the second polarizer are located on a first side of the first reflector, the second reflector is located on a second side of the first reflector, and the first side of the first reflector and the second side of the first reflector are two opposite sides of the first reflector; and the light being transmitted through the second polarizer and having the second polarization direction is transmitted through the first reflector, then is reflected by the second reflector back to the first reflector, and is transmitted through the first reflector again.

15. The method according to claim 14, further comprising:
emitting light toward a third reflector by using a third screen, wherein the third screen and the third reflector are in a third light path; and
emitting light toward a fourth reflector by using a fourth screen, wherein the fourth screen and the fourth reflector are in a fourth light path;
wherein the third light path and the fourth light path converge in a second position.

16. The method according to claim 15, further comprising:
converting the light emitted by the third screen into light having the first polarization direction by using a third polarizer between the third screen and the third reflector; and
converting the light emitted by the fourth screen into light having the second polarization direction by using a fourth polarizer between the fourth screen and the fourth reflector;
wherein the third reflector is in the fourth light path, the third reflector is reflective with respect to the light being transmitted through the third polarizer and having the first polarization direction, and the third reflector is transmissive with respect to the light being transmitted through the fourth polarizer and having the second polarization direction.

17. The method according to claim 15, wherein the first reflector and the third reflector have a first magnification; and the second reflector and the fourth reflector have a second magnification that is different from the first magnification.

* * * * *